3,595,818
THERMOPLASTIC MOLDING COMPOSITION CONTAINING POLYESTERS AND ALKALI METAL SALTS OF EPOXYCARBOXYLIC ACIDS
Klaus Weissermel, Kelkheim, Taunus, Hans Deiss, Augsburg, Rudolf Uebe, Hofheim, Taunus, and Rudolf Kern, Mainz, Germany, assignors to Farbewerke Hoechst Aktiengesellschaft vormals Meister Lucius & Bruning, Frankfurt am Main, Germany
No Drawing. Filed Nov. 28, 1969, Ser. No. 880,907
Claims priority, application Germany, Dec. 5, 1968,
P 18 12 944.7
Int. Cl. C08g 17/16
U.S. Cl. 260—22
9 Claims

ABSTRACT OF THE DISCLOSURE

Thermoplastic molding compositions suitable for injection-molding of linear saturated polyesters and alkali metal salts of epoxycarboxylic acids, which are distinguished by especially suitable crystallizing properties.

---

The present invention relates to a thermoplastic molding composition containing polyesters.

It is known that polyesters of aromatic dicarboxylic acids and aliphatic or cycloaliphatic diols can be worked under determined conditions into injection-molded articles which are used in the technical field because fo their excellent mechanical properties.

For the injection-molding polyesters it is very important to add crystallizing auxiliary agents. Only thus the high crystallization degree and, consequently, the hardness and dimensional stability necessary for the use in practice are imparted to the molded articles. Injection-molded articles from unmodified polyethylene terephthalate have an insufficient dimensional stability especially at temperatures above the second order transition temperature as their density is increased as a result of after-crystallization. It is also desirable to obtain the high crystallization degree as soon as possible in order to be able to reduce the residence time in the mold and to accelerate the production.

According to British Pat. 1,104,089 inorganic substances are used as crystallizing auxiliary agents, for example CaCO$_3$ or TiO$_2$ with a particle size below 2$\mu$. To obtain a good nucleating effect of inorganic substances it is necessary carefully to control all individual measures. In addition to very small particles a narrow particle size distribution of the nucleating agent is required. Moreover a completely homogeneous distribution of the additive in the polyester mass is necessary while avoiding an agglomeration of the particles. Besides a sufficient nucleating effect it is important that the molded article can be easily removed from the mold to render the working of the polyester injection-molding mass economical.

The present invention provides thermoplastic molding compositions which consist of (a) linear saturated polyesters of aromatic dicarboxylic acids and, if desired, up to 10% by weight, preferably 5% by weight of aliphatic dicarboxylic acids with saturated aliphatic or cycloaliphatic diols and (b) 0.05 to 1.5% by weight, preferably 0.08 to 0.6% by weight, calculated on the polyester, of alkalimetal salts, preferably sodium salts of carboxylic acids of the general formula R—COOMe in which R represents an alkyl, cycloalkyl, bicycloalkyl or aralkyl group containing an epoxide group with 2 to 20 carbon atoms which group may contain, if desired, ether groups and further alkali metal carboxylate groups, and which molding compositions have excellent properties as injection-molding material. The products of this compostion are distinguished by excellent crystallization properties. Even at low molding times molded articles of high crystallization degree and high surface gloss are obtained. It is known that the crystallization degree can be indirectly determined with the aid of the density. Polyethylene terephthalate, for example, has a crystallization degree of 35% with a density of 1.372 and of 40% with a density of 1.378. Even at low molding times a crystallization degree of 35% to 40% can be obtained using the additives in accordance with the invention. Moreover, when examining the density of the molded articles as a function of the molding time, it is evident that the density and thus the crystallization obtained are almost independent of the residence time of the article in the heated mold. No. after-crystallization takes place and, consequently, no deformation of the molded part at elevated temperatures. Moreover, the processing of the material can be accelerated.

In organic nucleating agents are, in general, not sufficient for a quick removal of the parts from the mold, which is necessary for an economical working, but additional removing agents, for example waxes or silicone compounds, are necessary for this purpose. With polyester masses nucleated in accordance with the invention an easier removability can be obtained so that additional mold release agents can be dispensed with. Using polyethylene terephthalate nucleated with 0.3% by weight of sodium salt of 9,10-epoxystearic acid molded articles are obtained, even in complicated molds which can easily be removed even after molding times of 5 seconds.

Good nucleating agents must generally be in the form of very small particles. Alakali metal salts to be used in accordance with the invention have the particular advantage that a grinding of the additives is not necessary as the salts dissolve in the polyester melt and thus are homogeneously divided.

Comparative nucleating tests with inorganic additives in admixture with a monoepoxide (for example talc, butylglycidic ether) also show a relatively small degradation of the polyester mass, but the density of the molded articles is more dependent on the molding time than it is with the use of the nucleating agents in accordance with the invention. A particular drawback is the strong adhesion of the articles to the walls of the mold and the flash formation of the molded articles.

A comparison with alkali metal salts of carboxylic acids without an epoxide group shows that they cause a degradation of the polyester mass by far stronger than the nucleating agents in accordance with the invention. Mixtures of monoepoxides with alkali metal salts of carboxylic acids (for example cyclohexene epoxide and sodium salt of cyclohexane carboxylic acid) do not reduce the degradation of the polyester mass. When nucleating with salts of carboxylic acids and their mixtures with monoepoxides poor injection-molding properties are obtained and, therefore, the articles are difficult to be removed from the mold.

The advantageous properties of the alkali salts of carboxylic acids containing an epoxide group may be due to the fact that the epoxide group of the nucleating agent can react with free hydroxyl or carboxyl groups of the polyester which leads to a linkage with the end of a polyethylene terephthalate chain. A maximum number of crystallite forming centers can so be obtained which are well incorporated in the linear polyethylene terephthalate chains.

As linear polyester polyethylene terephthalate is preferably used. There may also be used other polyesters, for example polycyclohexane - (1,4) - dimethylol-terephthalate, as well as modified polyethylene terephthalates which contain, in addition to terephthalic acid, also other aromatic or aliphatic dicarboxylic acids as basic units, for example isophthalic acid, naphthalene-dicarboxylic acid-(2,6) or adipic acid. There may also be used modified polyethylene terephthalates which contain, in addition to ethylene glycol, also other aliphatic diols, for example neopentyl glycol or butanediol-(1,4)- as alcoholic component. Polyesters of hydroxycarboxylic acids may also be used. The polyesters must have a reduced specific viscosity (measured at 25° C. in a 1% solution in a 60:40 mixture of phenol and tetrachlorethane) within the range of from 0.6 to 2.0 dl./g., preferably 0.9 to 1.6 dl./g. Especially suitable are polyesters with a reduced specific viscosity within the range of from 1.1 to 1.5 dl./g. Suitable crystallizing auxiliary agents are alkali metal salts of epoxy-butyric acid, glycidic acid, α- and β-methyl-glycidic acid, 9,10 - epoxy-dodecane-carboxylic acid, 9,10-epoxy-stearic acid, 3,4 - epoxy-cyclohexane-carboxylic acid, 3,4 - epoxy - 6 - methyl-cyclohexane carboxylic acid, 5,6 - epoxy-bicyclo - (2,2,1) - heptane-carboxylic acid-(2) the glycidic ethers of the salicylic acid and p-hydroxybenzoic acid, and furthermore alkali metal salts of 4,5-epoxy-cyclohexane - (1,2) - dicarboxylic acid and 4,5-epoxy-cyclohexane-(1,3)-dicarboxylic acid.

After the completion of the polycondensation the alkali salt may be applied to the ground or granulated polyester in suitable form, for example in powder form by simply rolling it in a suitable vessel. It may also be sprayed on the polyester granule in the dissolved state and the solvent may be removed in vacuo or at elevated temperature. The powder or granules provided on the surface with the nucleating agent is advantageously melted and granulated in an extruder before being worked to obtain a very homogeneous mixing of the components. It is also possible to add the alkali metal salt during the melt condensation.

All operations are generally to be performed with the exclusion of moisture to prevent the degradation of the polyester. The polyester mass advantageously contains less than 0.01% by weight of water. To obtain a rapid crystallization of the injection-molded articles the mold must be maintained at 100° C. at least. Mold temperatures within the range of from 120° to 150° are most suitable.

The following examples serve to illustrate the invention.

Example 1

1000 parts by weight of polyethylene terephthalate granules with a content of moistures of 0.008% by weight and a relative specific viscosity of 1.45 dl./g. were rolled at room temperature for one hour with 3 parts by weight of sodium-(9,10)-epoxy-stearate,

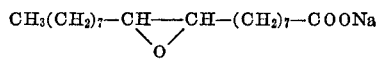

The granules so treated were homogenized at a temperature of 275° in an extruder and then again granulated. The granule was rapidly dried at high temperatures and injection-molded to form plates of 60 x 60 x 2 millimeters. The cylinder temperatures were kept constant at 270°/260°/260°; so were the mold temperature at 140°, the injection pressure at 140 atmospheres gage, the injection time at 15 seconds and the after-pressure at 90 atmospheres gage. The molding time was varied. The results obtained were summarized in the following table.

Example 2

1000 parts by weight of polyethylene terephthalate granules with a content of moisture of 0.008% by weight and a relative specific viscosity of 1.45 dl./g. were rolled at room temperature for one hour with 3 parts by weight of the sodium salt of the salicylic glycidic ether

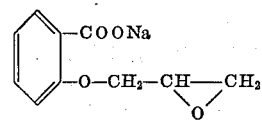

The further treatment was carried out as described in Example 1 the results being summarized in the following table.

Example 3

The same method was applied as in the preceding examples, except that for 1000 parts by weight of polyethylene terephthalate 3 parts by weight of 3,4-epoxy-cyclohexane-carboxylic acid sodium were used

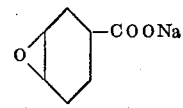

The following table shows the results obtained.

Example 4 (as comparison)

The same method was applied as in the preceding examples, except that for 1000 parts by weight of polyethylene terephthalate 3 parts by weight of sodium stearate $CH_3(CH_2)_{16}COONa$ were used. The results obtained are shown in the following table.

Example 5 (as comparison)

The same method was applied as in the preceding examples, except that for 1000 parts by weight of polyethylene terephthalate 3 parts by weight of talc and 3 parts by weight of butylglycidic ether were used. The results are shown in the following table.

Example 6 (as comparison)

The same method was applied as in the preceding examples, except that for 1000 parts by weight of polyethylene terephthalate 3 parts by weight of calcium carbonate $CaCO_3$ were used. The results are shown in the following table.

TABLE TO EXAMPLES 1 TO 6

| Example No. | Nucleating agent | Molding time of the plates, seconds | Relative specific viscosity, dl./g. | Density, g./cc. | Removability; quality of the plates |
|---|---|---|---|---|---|
| 1 | 0.3% $CH_3(CH_2)_7CH-CH-(CH_2)_7COONa$ with epoxide O bridge | 2<br>5<br>10<br>30<br>60<br>90 | 1.25<br>1.24<br>1.25<br>1.23<br>1.24<br>1.23 | 1.375<br>1.374<br>1.374<br>1.375<br>1.376<br>1.376 | Plates come out easily of the mold; plane glossy surface. |
| 2 | 0.3% benzene with -COONa and -OOCH₂CH-CH₂ (epoxide) 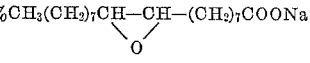 | 2<br>5<br>10<br>30<br>60<br>90 | 1.22<br>1.21<br>1.19<br>1.20<br>1.22<br>1.20 | 1.372<br>1.374<br>1.373<br>1.373<br>1.374<br>1.374 | Do. |
| 3 | 0.3% cyclohexane-O with -COONa 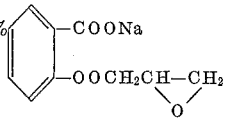 | 2<br>5<br>10<br>30<br>60<br>90 | 1.21<br>1.20<br>1.19<br>1.20<br>1.22<br>1.20 | 1.374<br>1.374<br>1.375<br>1.375<br>1.376<br>1.375 | Do. |
| 4 | 0.3% $CH_3(CH_2)_{16}COONa$ | 2<br>5<br>10<br>30<br>60<br>90 | 1.09<br>1.10<br>1.11<br>1.10<br>1.09<br>1.11 | 1.370<br>1.370<br>1.371<br>1.373<br>1.370<br>1.374 | Plates stick to the mold; fair removal from the mold, but plane plates. |
| 5 | 0.3% talc; 0.3% butylglycidic ether | 2<br>5<br>10<br>30<br>60<br>90 | 1.18<br>1.19<br>1.20<br>1.18<br>1.20<br>1.19 | 1.374<br>1.374<br>1.376<br>1.375<br>1.378<br>1.379 | Bad removal because of sticking to the mold. |
| 6 | 0.3% calcium carbonate | 2<br>5<br>10<br>30<br>60<br>90 | 1.20<br>1.20<br>1.19<br>1.18<br>1.19<br>1.20 | 1.375<br>1.375<br>1.376<br>1.375<br>1.378<br>1.379 | Bad removal because of sticking to the mold; plane plates from a molding time of 30 seconds onwards. |

What we claim is:

1. A thermoplastic molding composition for injection-molding which consists of
   (a) a linear saturated polyester of an aromatic dicarboxylic acid and up to 10% by weight of an aliphatic dicarboxylic acid with a saturated aliphatic or cycloaliphatic diol and
   (b) 0.05 to 1.5% by weight, calculated on the polyester, of an alkali metal salt of an epoxy-carboxylic acid of the formula R—COOMe in which Me stands for an alkali metal and R stands for an alkyl, cycloalkyl, bicycloalkyl or aralkyl of 2 to 20 carbon atoms which contains an epoxide group, and which may contain ether groups and further alkali metal carboxylate groups.

2. A thermoplastic molding composition as defined in claim 1, in which the linear saturated polyester is polyethylene terephthalate.

3. A thermoplastic molding composition as defined in claim 1, in which the linear saturated polyester is polycyclohexane-(1,4)-dimethylol-terephthalate.

4. A thermoplastic molding composition as defined in claim 1, in which the acidic component of the linear saturated polyester contains terephthalic acid and other aromatic or aliphatic dicarboxylic acids.

5. A thermoplastic molding composition as defined in claim 1, in which the alcoholic component of the linear saturated polyester contains ethylene glycol and other aliphatic diols.

6. A thermoplastic molding composition as defined in claim 1, in which the alkali metal salts of epoxy-carboxylic acids are selected from the group, consisting of epoxy-butyric acid; glycidic acid; α-methyl-glycidic acid; β-methyl-glycidic acid; 9,10-epoxy-dodecanecarboxylic acid; 9,10-epoxystearic acid; 3,4-epoxycyclohexane-carboxylic acid; 3,4-epoxy-6-methylcyclohexane carboxylic acid; 5,6-epoxybicyclo-(2,2,1)-heptane carboxylic acid-(2); the glycidyl ether of salicyclic acid; the glycidyl ether of p-hydroxybenzoic acid; 4,5 - epoxycyclohexane - (1,2) - dicarboxylic acid and 4,5-epoxycyclohexane-(1,3)-dicarboxylic acid.

7. A thermoplastic molding composition as defined in claim 1, in which the linear saturated polyester has a reduced specific viscosity, measured at 25° C. in a 1% solution in a 60:40 mixture of phenol and tetrachlorethane, within the range of from 0.6 to 2.0 dl./g.

8. A thermoplastic molding composition as defined in claim 1, in which the linear saturated polyester has a reduced specific viscosity within the range of from 0.9 to 1.6 dl./g.

9. A thermoplastic molding composition as defined in claim 1, in which the linear saturated polyester has a reduced specific viscosity within the range of from 1.1 to 1.5 dl./g.

References Cited
FOREIGN PATENTS 1,104,089  2/1968  Great Britain _____ 260—40

DONALD E. CZAJA, Primary Examiner

R. W. GRIFFIN, Assistant Examiner

U.S. Cl. X.R.

260—31.8; 32.2